United States Patent [19]
Schimkat et al.

[11] 3,744,587
[45] July 10, 1973

[54] STEERING ARRANGEMENT FOR VEHICLES, ESPECIALLY FOR MOTOR VEHICLES, HAVING A COMPENSATION FOR SIDEWISE FORCE AFFECTS

[75] Inventors: Harald Schimkat, Flechtorf; Wolfgang Lincke, Wolfsburg, both of Germany

[73] Assignee: Volkswagenwerk Aktiengesellschaft, Wolfsburg, Germany

[22] Filed: Aug. 2, 1971

[21] Appl. No.: 168,186

[52] U.S. Cl. ............................................. 180/79.2 R
[51] Int. Cl. .............................................. B62d 5/00
[58] Field of Search ........................ 180/79.2 R, 79.1

[56] References Cited
UNITED STATES PATENTS

| | | | |
|---|---|---|---|
| 2,987,135 | 6/1961 | Harvey | 180/79.2 R |
| 3,291,245 | 12/1966 | Hewko | 180/79.2 R |
| 3,011,579 | 12/1961 | Milliken et al. | 180/79.2 R |
| 3,576,228 | 4/1971 | Kasselmann | 180/79.2 R |

Primary Examiner—Benjamin Hersh
Assistant Examiner—John A. Pekar
Attorney—Ernest F. Marmorek

[57] ABSTRACT

In a motor vehicle, the combination of a steering arrangement with a control or regulating means for compensating the influence of distrubing side forces on the traveling direction, the regulating means comprising at least a first reference signal generator producing signals corresponding to or representative of the transverse movements of the vehicle, a coupling member receiving the signals of the first reference signal generator, a second reference signal generator producing signals representative of the steering instructions coming from the operator of the vehicle, the signals of the second reference signal generator being applied to the coupling member, a first regulator device coupled to the coupling member, the latter forming a regulating magnitude from the signals of the first reference generator and of the second reference generator and delivering such magnitude to the first regulator device, a steering servo mechanism coupled to the first regulator, the coupling member comprising a subtraction member forming a difference of the signals of the first reference signal generator and the second signal generator, whereby the control magnitude will not only lead to eliminate the undesired side force affects but also to improve the traveling and steering relation of the operator in contrast to a vehicle which does not have the control arrangement according to the present invention.

29 Claims, 10 Drawing Figures

STEERING ARRANGEMENT FOR VEHICLES, ESPECIALLY FOR MOTOR VEHICLES, HAVING A COMPENSATION FOR SIDEWISE FORCE AFFECTS

FIELD OF THE INVENTION

The present invention relates generally to a steering arrangement, and more particularly, it relates to a steering arrangement having a compensating servo mechanism therein for fully or partially eliminating the affects caused by side forces acting on the vehicle.

BACKGROUND OF THE INVENTION

It has been known that especially fast traveling motor vehicles at the sudden appearance of side forces which, for example, can be caused by side winds, become exposed to the danger that they will undergo such accelerations transversely to the direction of the travel that the operator cannot affect a countersteering in due time. Such transverse movements may also be caused by the unevenness of the road bed or, for instance, by sudden changes in the state of the road surface; this may throw off the vehicle in various directions, that is, cause it to experience accelerations in such directions.

There have been already steering arrangements having control loops therein created for the compensation of the affect of disturbing side forces acting transversely on the direction of travel of the vehicle. A steering arrangement described in German Pat. No. 1,041,818, 63c-47 is of this type. It comprises at least one first signal or reference generator which feeds signals into a first coupling member corresponding to the transverse movements of the vehicle and at the output of which there is a further signal corresponding to the driving or steering instructions of the operator which depend from the steering forces; such signals are produced by a second signal generator in correspondence with the signals derived from the steering instructions of the operator and a signal or control magnitude is being delivered to a first regulator member coupled thereto and to the output of which a steering servo mechanism is coupled. Due to the fact that the last described arrangement employs motion sensors as the reference generators, such described steering arrangement possesses an advantage with respect to the arrangement described in German Pat. No. 1,108,091, 63c-47 directed to the elimination of side wind affects and employing pressure sensors on the vehicle as the reference generators, in that the first mentioned arrangement provides a regulation independent from the cause of the disturbing side forces causing the transverse movements.

In the first described known steering arrangement, the first coupling member — which also forms the control signal or magnitude from the signals delivered by the first reference generator corresponding to the transverse movements of the vehicle and from the signal delivered by a second reference signal generator corresponding to the steering instructions of the operator — is formed as an adding member. Such addition of the disturbing signals (from the first sensor or reference generator) and of the steering instructions (from the second reference generator) and the use thereof as a control magnitude, as described in German Pat. No. 1,041,818, has the result that the operator traveling at high speeds will be forced at sharp curves to turn the steering wheel more than at low speeds or at less sharp curves. Such requirement of the known control arrangement should be characterized as undesirable. The end result is that the operator does not have an exact sensation to relate himself to the steering of the vehicle, since his relation to the steering always depends on the instantaneous vehicle speed. Such behavior of the known steering arrangement can lead to a situation wherein an operator who drives mostly in city traffic, while driving on the throughway and during avoidance of manoeuvers which may become critical at times, will not consider the influence of the forward velocity of his vehicle with respect to the necessary turning of the steering wheel and may not sufficiently go out of the way of a vehicle coming from the opposite direction.

SUMMARY OF THE INVENTION

It is, therefore, an object of the present invention to provide a steering arrangement for motor vehicles wherein the instantaneous speed of the vehicle in the direction of travel has no disadvantageous influences onto the steering relation or behavior of the operator.

According to the present invention, by feeding signals corresponding to the instantaneous forward speed of the vehicle will not only lead to eliminate the undesired side force affects but also to improve the traveling and steering relation of the operator in contrast to a vehicle which does not have the control arrangement according to the present invention and even in the absence of undesirable side forces.

While the first coupling member in the control loop according to German Pat. No. 1,041,818 is a summing or adding member, in contrast thereto according to the steering arrangement of the present invention, the second reference signal generator delivers signals corresponding to the driving or steering instructions of the operator, such as manifested by angular changes of the steering wheel, and the first coupling member is a subtraction member which forms a difference from both of the above mentioned signals. The subtraction ember used according to the present invention during intentional passing of curves provides a comparison of an actual and a reference value according to which the signals coming from the first reference signal generator and corresponding to the transverse movements of the vehicle will be counterfed to those which correspond to the steering instructions coming from the operator. Accordingly, only such cross or transverse movements of the vehicle will lead to the formation of an affective control magnitude which are caused by additional side affects, for example, by strong side wind. When there are no such disturbing side affects, the control loop produces no control magnitude but only translates in a preferred embodiment of the present invention the steering instructions of the operator into shifting forces affecting the cross-tie of the vehicle front axle.

In principle it is possible to construct the steering arrangement in such a manner that all influences caused by disturbing side forces could be eliminated. Such exact compensation would require, however, a complete consideration of the individual data of the vehicle so that the control loop should contain practically an analog computer and should compute at such face pace that the computing process would come up with a quick approximation of the desired curve of the traveling path. Both cases would mean an unreasonably large expenditure for commercially used vehicles. For this reason the control loop in accordance with the present invention is preferably laid out in such a manner that the undesired affects of the side forces become weakened, so that the operator does not have to countersteer as hard and as fast as in the case of an uncontrolled or unregulated vehicle. A further advantage of the steering arrangement according to the present invention is that the operator by being forced to take care of the steering corrections in the event of strong disturbing side forces, such as a strong side wind, will participate in the operation.

In the so far described structures the present invention offers the advantage that the first coupling member does not deliver a control magnitude (like the known arrangement described as the background of the present invention) which is the result of transversely acting forces and of the steering instructions of the operator and which becomes larger with the increasing speed with which the curve is passed. In this connection, especially advantageous is an embodiment of the present invention wherein a first control member receives a control magnitude depending on the forward velocity of the vehicle in order to attain a controlled passing of a curve within a predetermined speed region. By forming the first coupling member as a subtraction member, the vehicle at the appearance of disturbing side forces independently from the instantaneous forward velocity of the vehicle, will always pass the same controlled curve of traveling and, as a result, the operator will be given more time to take counter-measures even at high speeds, and without a special lay-out of the control loop he still will have to react faster at high speeds than at low speeds. This dependence on the speed, at least in a certain given speed range which may cover the entire possible speed ranges of the vehicle, can be eliminated by providing a speed dependence modulation of the control magnitude in the first control member by feeding it a control magnitude depending on the instantaneous forward speed of the vehicle. This control magnitude which is being fed or superimposed, as mentioned above, is selected in such a manner that at high forward or longitudinal velocities a control magnitude which has stronger affects is selected that it would be at low speeds.

By using speed depending signals, an embodiment of the present invention provides that in the connection between the first coupling member and the second reference signal generator there is a second control member fed by a second control magnitude dependent on the forward or longitudinal velocity of the vehicle in order to attain a desired running stability for the vehicle. This further embodiment of the present invention makes it possible that the vehicle for any desired velocity can be constructed either oversteered or understeered. It is a condition also for this construction of the steering arrangement that by constructing the first coupling member as a subtraction member practically only such transverse movements of the vehicle will lead to the formation of an effective control magnitude that are created only by undesired side forces.

As mentioned above, the feeding of a control magnitude depending from the longitudinal velocity of the vehicle to the first controller or regulator will lead to a traveling curve that is independent from the speed even at the appearance of disturbing side forces. This advantage is fully appreciated only when in accordance with another embodiment of the present invention, the first control member in order to attain the above mentioned controlled traveling path or curve in a predetermined region of the side forces is formed as a non-linear control member. Since according to the present invention always the first control member is formed as a subtraction member, the affect of such measures manifests itself especially in the compensation of disturbing side forces causing transverse accelerations of the vehicle, not however, in the case of transverse movements which are caused by intentional steering instructions coming from the operator. In this respect the same is true also for a non-linear construction of the second control member which assures an independence of the steerability from the magnitude of the steering instructions.

As already mentioned above, an essential feature of the present invention resides in the avoidance of a counter regulation to the driving or steering instructions coming from the operator, which fact led to the formation of the first coupling member as a subtraction member.

In a further embodiment of the present invention it becomes possible that the control loop is fed with the steering instructions coming from the operator in such a manner that the steering servo mechanism in the control loop functions at the same time to aid the operator. This aiding or superimposing a further affect is accomplished in such a manner that in the coupling between the first control member and the steering servo mechanism a second coupling member is provided which at its input is connected through a third control member with the second reference signal generator; and to such third control member a third control magnitude depending on the longitudinal velocity is fed in order to attain a desired dependence from the longitudinal velocity of the vehicle in aiding the carrying out of the steering instructions of the operator by the steering servo mechanism. This second coupling member is thus placed behind the first coupling member in the direction of the regulation and also behind the first control member, so that at the input of the steering servo mechanism the control magnitude (insofar as disturbing transverse movements of the vehicle are present) and the signals are added which depend always from the instantaneous driving or steering ilstructions. The steering servo mechanism in this embodiment of the present invention is thus used in a dual fashion, namely, as a part of the control loop to attain a positioning magnitude in the first sense, and also as a part of the controlled path in order to aid in the carrying out the steering instructions of the operator, in the second sense.

An essential difference between this embodiment of the present invention and the arrangement according to German Pat. No. 1,048,818 is evident: the aiding of the signals coming from the operator as steering instructions and the signals delivered by the first reference signal generator and corresponding to the transverse movements of the vehicle is performed not in the control direction and before the control member, that is, in the first coupling member, but according to the present invention at that point an actual value and reference value comparison takes place, so that an affective control magnitude will not be called upon or generated by transverse forces which are the result of carrying out the steering instructions coming from the operator. According to the present invention, the addition or joining occurs only behind the first control member so that signals corresponding to the transverse movements of the vehicle will appear as control magnitudes obtained from the joining with the signals depending from the steering instructions of the operator.

The aiding of the carrying out of the steering instructions of the operator by the steering servo mechanism in dependence from the speed is arranged in such a fashion that such aiding becomes apparent only at a low forward velocity of the vehicle. Then at least in one certain speed region there is, in principle, a servo steering. By forming the third controller or regulator as a non-linear regulator, there is attained a non-linear dependence or relationship of the aided affect of the servo steering with respect to the velocity of the vehicle.

Especially in the use of the steering servo mechanism also for the transmission and for the amplification of the steering instructions coming from the operator, it is purposeful that parallel with respect to the steering servo mechanism a direct transmission path for the steering instructions to the cross-tie is provided, so that in case of a damage in this part of the control loop the steerability of the vehicle will not be lost. The condition for the use of such parallel transmission path is, however, that the steering servo mechanism has a directional blocking means coupled thereafter, which transmits motions only in the direction of the regulation, so that no signals can run into the steering servo mechanism in the opposite direction. In a given case such direction blocking means can be contained in the steering servo mechanism, for instance, in the form of a self-locking means. In particular, the steering arrangement will be constructed in such a manner that in the steering servo mechanism, that is, in the direction blocking means, a limit switch is placed which is actuated in case of disturbances in the control loop, and after the limit switch a third coupling member is connected in the form of an adding member for the forces given by the steering servo mechanism and for the steering instructions.

Accordingly, the purpose of the invention is to relieve the operator especially in cases where, upon the appearance of strong disturbing side forces acting on the vehicle, a quick reaction by the operator is necessary, and to relieve the operator so that he is allowed to concentrate more on traffic safety. This object will find realization in another embodiment of the present invention which itself is entirely different from the previously described possibilities and characteristics of the preceding embodiments of the present invention; therefore, this feature can be used in combination with the previously described embodiments.

As discussed above, the invention is intended to compensate for the influences of strong disturbing side forces acting on the vehicle to a desired extent so that the operator in the ideal case has really nothing to contribute in this sense; this does not mean, however, that in all cases the operator can let the steering wheel go. This problem will be discussed lateron in detail in the description of an embodiment shown in a specific figure.

In connection therewith, the present invention provides a pair of levers transmitting a rotational momentum; one of the levers forming a momentum support for the lever arrangement at the introduction to it of the momenta produced by the steering servo mechanism has a means associated therewith delivering a dynamic supporting momentum therefor only when the momenta produced in the steering servo mechanism are released by dynamic disturbing side forces. One is obviously interested here in that automatically a supporting momentum could be produced with exactly the necessary magnitudes so that the driver does not have to contribute an additional supporting momentum at all. For this reason signals derived from the momentum produced at the appearance of the disturbing side forces are taken out from the steering servo mechanism and fed to the means delivering the supporting momentum. For example, the means can have as the criterion for the formation of the supporting momentum, the relative velocity between both levers, where the lever considered is the one which serves for the introduction of the momentum. This has the advantage that even at an intentional turning of the steering wheel there will be automatically a supporting momentum formed until stationary relations will prevail (the steering servo mechanism).

By this criterion the possibility is furthermore given that after setting an intentional change in the traveling direction, that is, when steering instructions by the operator are present, over the means a static momentum aiding the operator in the steering to a desired extent is transmitted to one of the levers, such momentum having been produced by the steering servo mechanism. Also this fact requires a certain structuring of the means. When during the appearance of disturbing side forces and during the turning of the steering wheel care is taken that according to the present invention the automatically produced supporting momentum has a magnitude always corresponding to the momentum delivered by the steering servo mechanism, one should also for example have the means to produce a supporting momentum corresponding to and depending in magnitude upon the magnitude of the then appearing relative distance between both levers. One will for the steering instructions frequently choose a different momentum transmission over the means in dependence from the velocity of the vehicle. By a momentum aiding the steering there should be understood within tee scope of the present invention not only such momentum which operates in the same sense as the steering momentum caused by the operator, since here it is not really aiding the steering process. Therefore, it might be purposeful, for instance, that the aiding momentum at high vehicle velocities in the forward direction is opposite to the momenta corresponding to the steering instructions, so that the operator will be required to apply a relatively large momentum on the steering wheel in order to attain a desired turning of the wheels. On the other hand, at low forward velocities of the vehicle, as for example, during backing into parking places, an aiding momentum similar in sense to the steering momentum produced by the operator will be transmitted over the above named means.

There are two basic possibilities for the selection and for the layout of the above mentioned means. For example, the means may contain active members to which at least a control signal is fed which is characteristic in its magnitude to the appearance of the disturbing side forces. Members or elements of the servo-system type can be used here which, for example, securely rest on the vehicle and transmit a force, creating the supporting momentum, to one of the levers serving for the introduction of the momenta. As a control signal they can be supplied by a signal corresponding in its magnitude to the relative velocity between both levers. A further control signal or controlling magnitude may be the magnitude of the relative distance between both levers; also this control signal or control magnitude serves for the determination of the magnitude of a supporting momentum.

Preferably a servo system having a PT1 behavior is used which also secures the static momentum support.

In the other basic possibility for the selection and layout of the means, they contain passive members coupled with both levers and having such damping that these members with respect to the transmission of the forces creating the supporting momentum act as igh pass means. Here the force transmission takes place indirectly from the other to the one lever and only when the disturbing side forces or new steering instructions appear. Inasmuch as such disturbing side forces can appear very quickly and, accordingly, the momenta delivered by the steering servo mechanism can rise very steeply, one can use here, as a criterion for the presence of disturbing side forces with respect to the static steering instructions given by the operator, the speed of the relative motion between both levers. This is done by using passive members having a "speed-dependent" damping. Parallel to these damping members there may be used springs for the transmission of the momenta aiding the operator in the steering. While in the dynamic case, such as at the appearance of disturbing side forces, the damping means becomes relatively rigid and, accordingly, forces are transmitted from one lever to the other to create the supporting momentum, in the static case, that is during an intentional turning of the wheels by the operator, they are so soft that the springs become affected and the momentum aiding the steering process is transmitted to one lever to the desired extent.

One of the above described embodiments of the present invention will be equipped with a lever arrangement containing a lever having two arms with respect to the cross-tie and which is rotatably coupled to the cross-tie guide in parallel; one of the lever arms connected with the one lever will have introduced the momenta corresponding to the steering instructions of the operator and the other lever arm thereof coupled with the other lever will have introduced thereinto the momenta produced by the steering servo mechanism, so that the cross-tie is moved parallel to a path which depends upon the vector sum of the momenta. The embodiment constructed according to the present invention with this special concept has a shock absorber supported between points on both levers, or at positions coupled with these points of other parts, and at the appearance of momenta the point lying on the other lever will be moved faster in the axial direction than the point lying on the one lever.

This concept can be considered as stemming from the embodiment which will be described in connection with FIG. 6.

In another embodiment of the present invention there is also a lever arrangement provided containing a cross-tie guided parallel with respect to the guiding lever. It is characterized in that one of the levers forms an input shaft of a differential drive or gear to which also over a gear wheel coupled to the other lever the momenta produced by the servo motor are fed. It forms the subtraction member the output shaft of which operates on a guiding gear of a ball race type having a female part coupled to the guide lever and between this female part and a further female part on a threaded spindle coupled with the gear wheel, the pitch of the threaded spindle being larger than that of the threaded spindle of the steering gear, at least one shock absorber or in some cases at least a spring means is arranged. The differential gear serves for the reversal of the sign of the momenta corresponding to the steering instructions and for the addition of such momenta to those momenta that are produced over the regulator by the steering servo mechanism. The transmission of the supporting momenta occurs here over both female parts which, due to their different pitch, attempt to change their relative distance at the appearance of disturbing side forces. Also here the parallel connection of damping members and spring members can be had, if necessary, to transmit onto the steering gear an aiding momentum aiding the steering process during an intentional passing of a curve.

Finally, from among the large number of possibilities of construction a third one will be described broadly. In it one of the levers is in the form of an input shaft of a planetary gear which, together with a gear wheel coupled with the other lever and formed as an outer rim of the planetary gear, forms an adding steering gear which adds the momenta. At this point it has to be noted, as is apparent also from the detailed description of this embodiment of the present invention, that the concept "lever" which is used to describe both members serving for the momentum insertion, does not necessarily mean a bar-like lever, as this definition should cover also elements that can be used to perform this function. In this case, one of the levers is also formed by the input shaft of a planetary gear. The other lever may be in the form of a worm in coupling connection with a servo motor and which is in combing relationship with a worm gear formed as the outer rim of a planetary gear.

Further features of this embodiment of the present invention reside in that between the input shaft of the planetary gear and the steering gear at least a damping member or, in some cases, at least one spring is provided. This damping member contains as a preferred embodiment of this solution according to the present invention, a racer arranged to rotate on the input shaft and has radial projections which are forced by means of springs against the rim of a recess in a housing member containing a damping medium and which with the rim portion forms a chamber or chambers for the damping medium. This housing portion is retained in a fashion surrounding the input shaft on the outer rim of the steering gear and in a fashion vertically displaceable with respect to the input shaft and the displacement of the recess transversely with respect to the input shaft will result in different magnitudes for the chamber and thereby different damping can be created in an adjustable fashion. A rotation of the shaft together with the radial projections which are in the form of a star, in the event that the recess is arranged in an excentric fashion with respect to the shaft, will bring about that the magnitude preferably of the same chamber during rotation, as a result of the abutting of the radial projections onto the rim portion of the recess, will continuously change, for example reduce, so that the damping medium will flow out of the chamber through small cross sectional passages. This has an increased damping effect with respect to that point of the recess in relation to the input shaft at which the axes of the recess and the input shaft are aligned.

BRIEF DESCRIPTION OF THE DRAWINGS

The invention will become more readily apparent from the following description of preferred embodiments thereof shown in the accompanying drawings, in which.

DESCRIPTION OF THE PREFERRED EMBODIMENTS

Figure 1:
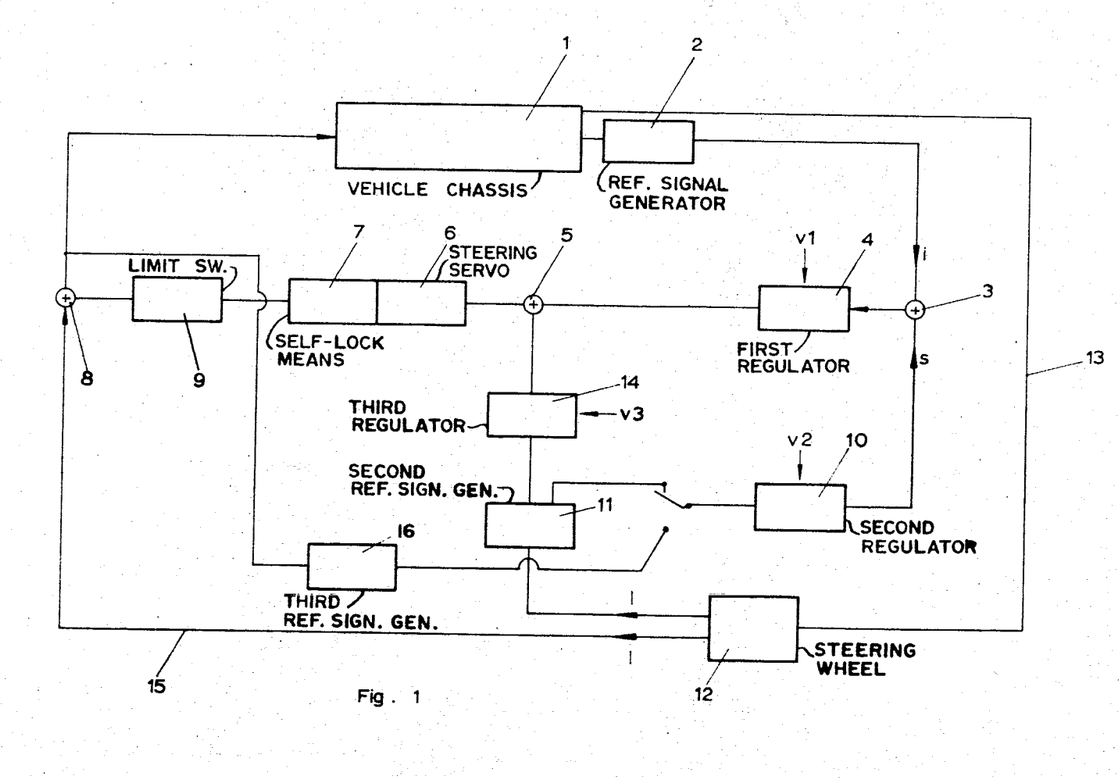
FIG. 1 is a block diagram of the entire control arrangement according to the present invention.

With reference to FIG. 1 it is seen that a control circuit or loop itself contains a first measuring or reference signal generator by which, in the event the vehicle 1 in this embodiment experiences transverse movements affecting it, such as transverse accelerations, the reference signal generator 2 will be actuated and which at its output has a first coupling or logic member 3 connected therewith. Such logic or coupling member 3 has its output coupled to a first regulator 4 which delivers over a second logic or coupling member 5 a control signal or magnitude onto a steering servo mechanism 6. The steering servo mechanism 6 can be constructed electrically, hydraulically and pneumatically and has a self-locking means 7 associated therewith which, in the present embodiment, can be in the form of a self-locking worm gear and which takes care that the control loop will transmit only motions in the direction of the regulation and that thus no movements can enter into the steering servo mechanism 6 from the direction of the coupling or logic member 8 over the limit switch 9. The limit switch 9 interrupts the control loop, for example, in case the given control instructions increase, or if there is a defect in the control loop.

An essential element of the present invention is the layout of the first coupling or logic member 3 in the form of a subtraction member operating on the actual value signal "i" corresponding to the instantaneous transverse movements as delivered by the reference signal generator 2, on one hand, and on the other hand, on signals "s" delivered by the regulator 10. The second regulator 10 receives signals over a second reference signal generator 11 which can be in the form of a potentiometer and corresponds to the steering instructions 1. The reference numeral 12 identifies the actual steering arrangement, that is, for example, the steering wheel. The operator receives through the information path identified as 13 the necessary steering impressions which are needed to deliver the necessary steering instructions.

The second regulator 10 and the second reference signal generator 11 take care, in connection with the first coupling member 3 formed as a subtraction member, that the vehicle despite its high insensitiveness to disturbing side forces remains still capable of responding to curves and follows the steering instructions 1 coming from the operator at 12. The transverse movements of the vehicle caused by the operating or steering instructions develop also signals in the first reference signal generator 2 which are fed to the first coupling member 3 in the form of actual value signals "i." Since in this coupling member 3 a comparison with the desired or reference signal "s" takes place, the component of the actual signal "i" coming from the steering instructions 1 is compensated in the first coupling member 3, so that the first regulator 4 will receive a control magnitude which contains as its information practically only the signals of the first reference signal generator 2 as caused by the disturbing side forces.

In contrast to the above, in the present embodiment the second coupling or logic member 5, as well as the third coupling or logic member 8, are formed as adding members. Namely, at the output of the second reference signal generator 11 there is a coupling established over the third regulator 14 with one of the inputs of the second coupling member 5. This path serves to use the steering servo mechanism 6 in a dual fashion, namely not only as a component of the control loop to obtain a positioning magnitude, but also at the same time to aid the carrying out of the steering instructions 1 given by the operator. An essential feature of the arrangement is, as said before, the layout of the first coupling or logic member 3 in the form of a subtraction member, that is, the introduction of the steering instructions 1 or the signals depending therefrom first within the control loop only in the control direction and behind the second coupling member 5.

The third coupling member 8 which in an exemplary fashion is formed in the shape of a mechanical adding circuit by means of a planetary gear, is a component of the transmitting path 15 which runs parallel with the control loop and which causes a direct transmission of the steering instructions 1 to the cross-tie of the front axle of the vehicle 1. This transmission path 15 remains effective when the limit switch 9 in the control loop is actuated and the control loop becomes interrupted.

As apparent from the above description of the preferred embodiments of the present invention, the main object of the present invention is the retention of the intentional course of traveling independent from the appearing disturbing side forces and from the forward velocity. It becomes necessary to explain the concept "same course of traveling" in somewhat more detail. In connection herewith one should understand the meaning of two different magnitudes. In the following, the diagrams according to FIGS. 2a and 2b, as well as FIGS. 3a and 3b will be explained in detail, and in this connection it should be understood that the course of travel within the scope of the present invention means that course or curve which the sidewise displacement of the vehicle describes in dependence from time. It is also possible to consider as the course of travelling or path of travelling within the scope of the present invention the path actually described by the vehicle, that is, the relationship between the sidewise displacement and the path measured in the direction of travelling.

Figure 2A:
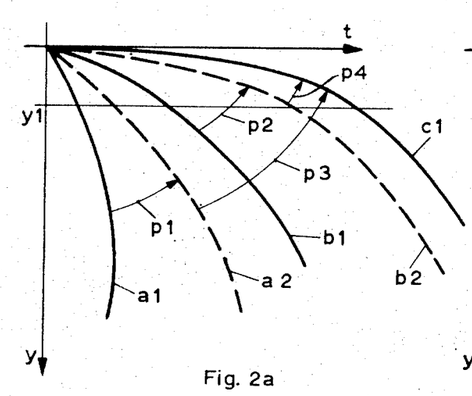
FIGS. 2a, 2b and 3a, 3b are graphical representations of the effect of the different velocity-dependent signals.
Figure 2B:
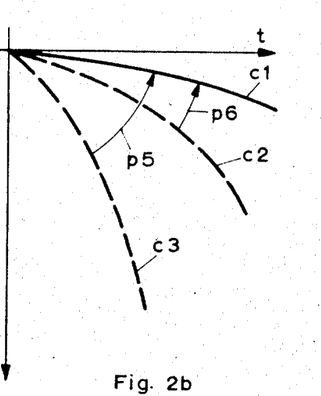

Considering now the diagram shown In FIGS. 2a and 2b, it is seen that they convey the relationship between the sidewise displacement "y" of the vehicle and the time "t." The curves a1 and b1 relate to an uncontrolled steering and specifically the curve b1 relates to a travelling state having a smaller forward velocity that the curve a1. For all curves appearing in FIG. 2a it has been assumed that a contant disturbing side force is affective.

The insertion of a control arrangement has merely the affect that the curve a1 is shifted into the curve a2 according to the arrow b1, while the curve a2 lies such that the operator at the appearance of the appropriate disturbing side forces will have more time for the introduction of counter measures. Considering for y1 a certain value of the side displacement of the vehicle, the time t until the appearance of a sidewise displacement in the case of curve a1 is considerably smaller than in the presence of the controlled curve a2. The same is true for the uncontrolled curve b1 which according to the arrow p2 is shifted and thereby the associated controlled curve b2 is created, that is, at low velocities.

If the path of traveling, as seen in FIG. 2a, is defined within the scope of the present invention as the relationship between the sidewise displacement of the vehicle y and the traveling time t, the arrangement according to the present invention is laid out in such a way that both controlled curves a2 and b2 become united into a controlled traveling curve c1. In this connection it should be pointed out that the curve c1 is not necessarily a curve in the sense of a narrow line since, also here, there can be a certain range present which in the diagrammatic representation can be in the form of a strip. In order to attain this, that is to attain the displacement corresponding to the arrows p3 and p4, which always depends on the instantaneous forward velocity of the vehicle, the first controller or regulator 4 will be fed with a control magnitude indicated by v1 in FIG. 1, which depends from the velocity. As a result of this regulation the regulated traveling curve results are indicated by c1 in FIG. 2.

With the above only the dependence from the velocity has been eliminated, not however, the influence of the difference in the appearing disturbing side forces. As shown in the diagram of FIG. 2b, in which now the forward velocity has been assumed to be constant, the regulated traveling curve c1 according to FIG. 2a is obtained which is independent of the forward velocity of the vehicle but only for a certain defined magnitude of the disturbing side forces. At other disturbing side forces the broken curves c2 and c3 are obtained. It becomes necessary that by other additional measures the curves c2 and c3 be shifted according to the arrows p5 and p6 so that they practically are aligned or fall together with the curve c1. This is attained thereby that the first regulator 4 possesses a certain non-linearity, so that the regulating magnitude delivered by the first regulator 4 has a non-linear relationship with the signals delivered to the input of the regulator 4.

Figure 3A:
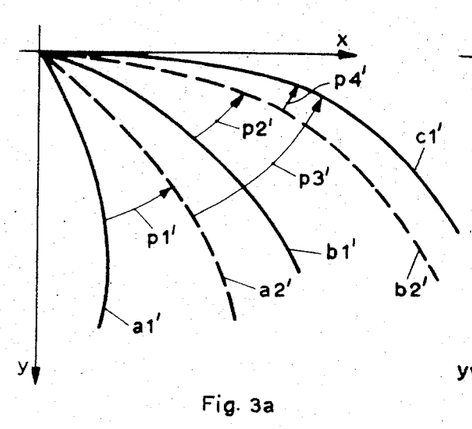
Figure 3B:
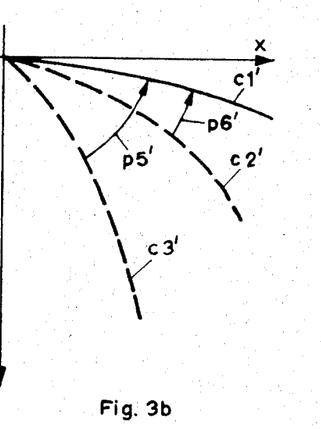

While according to FIGS. 2a and 2b the relationship between the sidewise displacement y and the traveling time t has been considered as a controlled traveling curve, the diagrams seen in FIGS. 3a and 3b provide that the definition of the controlled or regulated traveling curve is the path actually passed by the vehicle. The diagrams of FIG. 3a and 3b are practically identical with those of FIGS. 2a and 2b although obviously different scales can be present. The curves in FIGS. 2a and 2b correspond to the curves in FIGS. 3a and 3b and are designated by the same reference numerals, except that they have been primed for distinction. All that has been said in connection with FIGS. 2a and 2b is true also with respect to FIGS. 3a and 3b, the only difference being that now the regulated traveling curve c1' is understood to be the traveling curve actually passed by the vehicle.

It is noted from these figures that the regulated traveling curves c1 and c1' do not fall together with the abscissa axis in each case. At large regulation requirements when a regulated traveling curve would still be preferred, this is attained with a certain deflection from the ideal curve, that is from the axis of the abscissa in the figure. Namely only then the operator receives the sensation or a feeling for the disturbing side forces, such as a disturbing side wind; however, to show a reaction by him is impossible. For this purpose there is done a certain light underregulation. Just as before, this regulation possesses the basic advantage that the operator will have sufficient time to introduce countermeasures which consist only in relatively small steering wheel turns.

A third control magnitude v3 depending from the forward velocity of the vehicle will be fed exclusively to the third regulator 14. This control magnitude has a role to aid the carrying out of the steering instructions 1 and to have them executed in such a manner that at large velocities the aiding is reduced nearly to nothing, while at low speeds, such as during parking, a considerably strong aiding of the steering instructions 1 takes place.

In a region of selected velocities it might also be possible that the second regulator 10, instead of being fed over the second reference signal generator 11, is fed over a third reference signal generator 16, and not with signals which depend directly from the steering instructions 1, but with the summation signals formed in the third coupling or logic member 8.

Inasmuch as the transverse movements of the vehicle usually do not depend linearly from the magnitude of the disturbing side forces, it is preferred to construct the first and the second regulators 4 and 10 in a non-linear fashion. Also this measure is intended for the attainment of the same regulated traveling curve at different magnitudes of influence, here at differently large side forces and steering instructions.

In the following a few preferred embodiments including the individual components of the steering arrangement according to the present invention will be described.

The first reference signal generator or sensor may be made in the form of known acceleration sensors, such as described in the previously mentioned German Pat. No. 1,041,818. With respect to the second reference signal generator or sensor, as mentioned above, it can be in the form of a potentiometer. Usually, a rotating type potentiometer is applied which, for example, can be coupled with the steering column or with the steering gear. A similar construction can be used also for the third reference signal generator or sensor.

Figure 4:
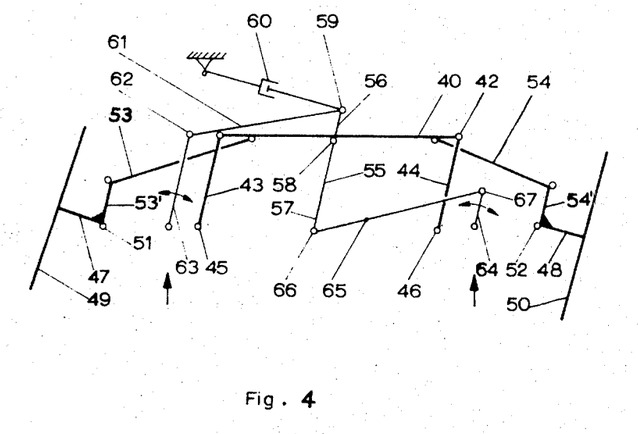
FIGS. 4–8 illustrate various constructive embodiments of the present invention.

An example for the construction of the mechanical adding member which can be used as the third coupling or logic member is shown in FIG. 4. By solid lines those parts are outlined which can be used, or have been used already, in known steering arrangements not having any regulation. A special advantage of the construction of the third coupling member, shown in FIG. 4, is the fact that the steering geometry of the known arrangements has been retained. Also in the arrangement according to FIG. 4, the cross-tie 40 over the joint-like coupling 41 and 42 is guided in parallel fashion by means of levers 43 and 44 which, in turn, are tiltably supported at 45 and 46. As in the known arrangements, the axles 47 and 48 of the wheels 49 and 50 are tiltably supported about a vertical axis by means of axle shank bolts 51 and 52. The tiltable movement over the levers 53 and 54 which at their ends are tiltably joined to the cross-tie 40 and over the levers 53' and 54' which are securely coupled with the axles 47 and 48, is transmitted to the latter.

While the steering forces exerted by the steering gear in a usual manner are inserted in the lever 43, in the embodiment according to FIG. 4 for this reason an additional lever arrangement is provided into which simultaneously a positioning magnitude obtained from the regulating magnitude coming from the steering servo mechanism is also introduced. This additional lever arrangement contains as its essential element an adding lever 55 which is formed as a two-armed lever. Each of the arms 56 and 57 extends starting from the rotating connection 58 with the cross-tie 40, to one of the two levers. Considering now the upper lever end as seen in the figure, it carries a support 59 permitting relative rotation for the oscillation damper 60 and a lever 61 which at 62 is also rotatably coupled with the lever 63 and into which the forces derived from the steering instructions of the operator and delivered from the steering gear are introduced. In the illustrated embodiment it has been assumed that such forces are introduced as rotational forces which cause an angular shift of the lever 63 according to the bi-directional arrow shown in the drawings.

The introduction of the positioning magnitude into the additional lever arrangement is similar hereto. This insertion occurs onto the lever 64 which over a lever 65 pivotably connected thereto is coupled with a joint 66 at the lower end of the adding lever 55, as seen in the figure. Both levers 63 and 64 serving for the insertion of the forces are supported at their free ends.

Considering now the operation of the above described arrangement, if no disturbing side forces appear, no forces are introduced into the lever 64, and if the operator delivers any steering instructions, a positioning of the illustraged arrangement occurs only by the tilting of the lever 63, for example, in clockwise direction. This will have the result that the bearing 67 on the upper end of the lever 64 remains in its place and the bearing 69 undergoes tilting motions. At the same time it carries by means of the rotating coupling 68 the cross-tie 40 from left to right, as seen in the figure, and on a path which depends from the dimensioning of both lever arms 56 and 57. The parallel movement of the cross-tie 40 comes about in such a manner that the bearing positions 41 and 42 move about a circular path about the bearing 45. As a result, a turning of the wheels to the right occurs, as seen in the figure.

Considering now the additional lever arrangement, there is a practically opposite operation present when only a positioning signal is introduced into the lever 64 created by the disturbing side forces and coming from the regulating loop. Now the location of the joint 62 will be retained and the cross-tie 40 will be displaced to the right in the figure.

It has been found advantageous to select the length of the lever arms 55 and 56 in such a manner that the second angle of rotation is made different by about one tenth with respect to the first angle of rotation. It should be understood in this connection that the differently dimensioned lever arms being about an angle of rotation dimensioned on one hand by the steering signals and also, on the other hand, by the positioning magnitudes, so that these have different affects on the position of the cross-tie 40 and thereby on the positioning of the regulated wheels. In this way the operator enjoys a priority with respect to the regulator.

When during the description of the construction according to FIG. 4 sometimes the concept "upper" and "lower" has been used, it should be understood that this reference has been made only to the schematic illustration in the figure, since obviously FIG. 4 is only a top view representation.

Figure 5:
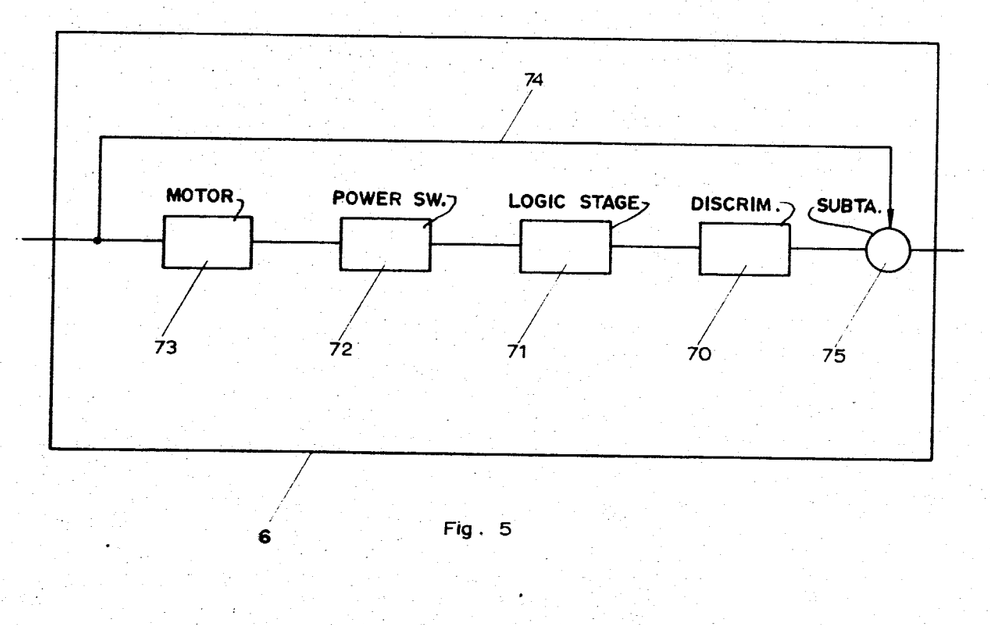

With reference to FIG. 5 the preferred embodiment for the steering servo mechanism is described. The steering servo mechanism has been identified by the reference numeral 6 in FIG. 1. In this embodiment the steering servo mechanism itself is constructed as a regulating loop. It comprises in the regulating direction, that is, from the right to the left in FIG. 5, a discriminator 70, a logic stage 71, a power switch 72 and the motor 73 itself.

The discriminator 70 has the function of turning the regulating magnitudes delivered by the first regulator into rectangularly shaped electrical signal voltages. In the logic stage 71 a decision is made whether the motor 73 should be driven to the left or to the right. The corresponding commands or instructions are translated by the power stage 72 in such a manner that the energy necessary for the driving of the motor 73 will be present in sufficient quantity.

As noted at the beginning, the embodiment illustrated in FIG. 5 for the steering servo mechanism 6 is laid out itself as a regulating loop. For this purpose there is provided a feedback 74 from the output of the motor to the input of the discriminator 70. It is returned there into the fourth coupling member 75 which again is laid out in the form of a subtraction member and performs a comparison between an actual value and a reference value. Such a comparison is necessary since the motor obviously lags behind the regulating magnitude with a certain phase difference.

With respect to the construction of the individual components of the servo amplifier, known literature can be consulted. With respect to the subtraction member 75 and consequently also with respect to the first coupling member 3 in FIG. 1, as well as with respect to the employed electrical adding member, the following literature should be referred to:

a. "Operationsverstarker und ihre Schaltungstechnik." Author: Dipl.-Ing. W. Schaufelberger, 4th edition, published by: Kontron GmbH & Co. KG, Munchen, West Germany; pages 11, 14, 16.

b. "Operationsverstarker, Theoretische Grundlagen und Anwendungsbeispiele." Author: Dieter Bendisch, 1969. Publisher: Alfred Neye, Enatechnik, Hamburg-Quickborn, West Germany; pages 7 et seq., 49.

c. "Linear Integrated Circuits." Author: Radio Corporation of America. Publisher: Alfred Neye, Enatechnik; pages 75 et seq., 235 et seq.

The discriminator 70 can be constructed as described in the following references:

d. "The Application of Linear Microcircuits." Author: The Application Engineering Staff of the SGS-Fairchild Group; publisher: SDS-Fairchild; second edition, 1967; page 114.

For the logic stage 71 the following may be considered:

e. "Lehrbuch der Hochfrequenztechnik." Author: Zinke/Brunswik. Publisher: Springer Verlag; pages 526 et seq.

f. "Digitale Elektronik." Author: Herhard Wolf, 1969 Publisher: Franzis-Verlag, Munchen, West Germany; pages 84 et seq.

For the power switch 72 the following literature can be consulted:

g. "Elektronik Schaltungen." Author: Fritz Bergtold Publisher: Richard Pflaum Verlag, Munchen, West Germany; page 348.

h. "Transistor Schaltverstarker." Author: Lothar Sabrowsky, 1969 Publisher: Franzis-Verlag, Munchen, West Germany; page 138.

In the first group of the reference literature there are also examples for the PI-regulator which can be constructed as low pass means and can be used in the arrangement according to the present invention.

An advantage of the present invention may be seen therein that it can be constructed from known electronic elements. Hydraulic, pneumatic or mechanical devices may, however, also be used.

Figure 6:
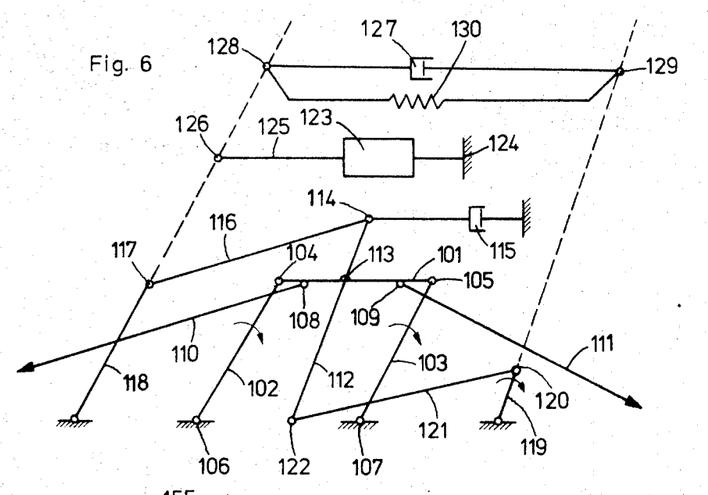
Figure 7:
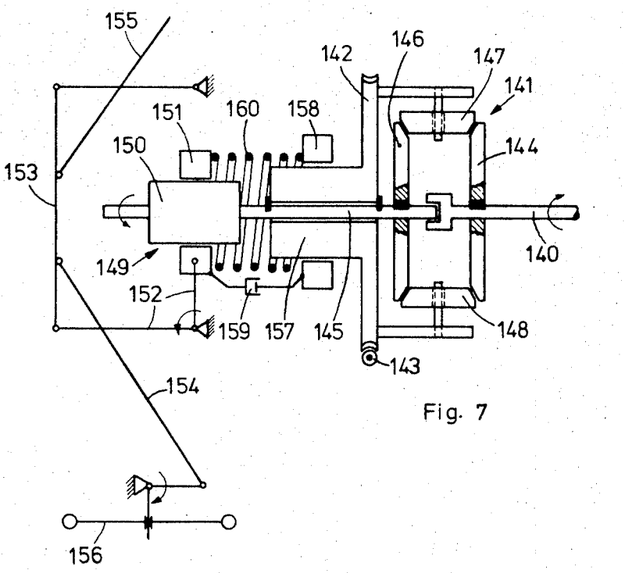
Figure 8:
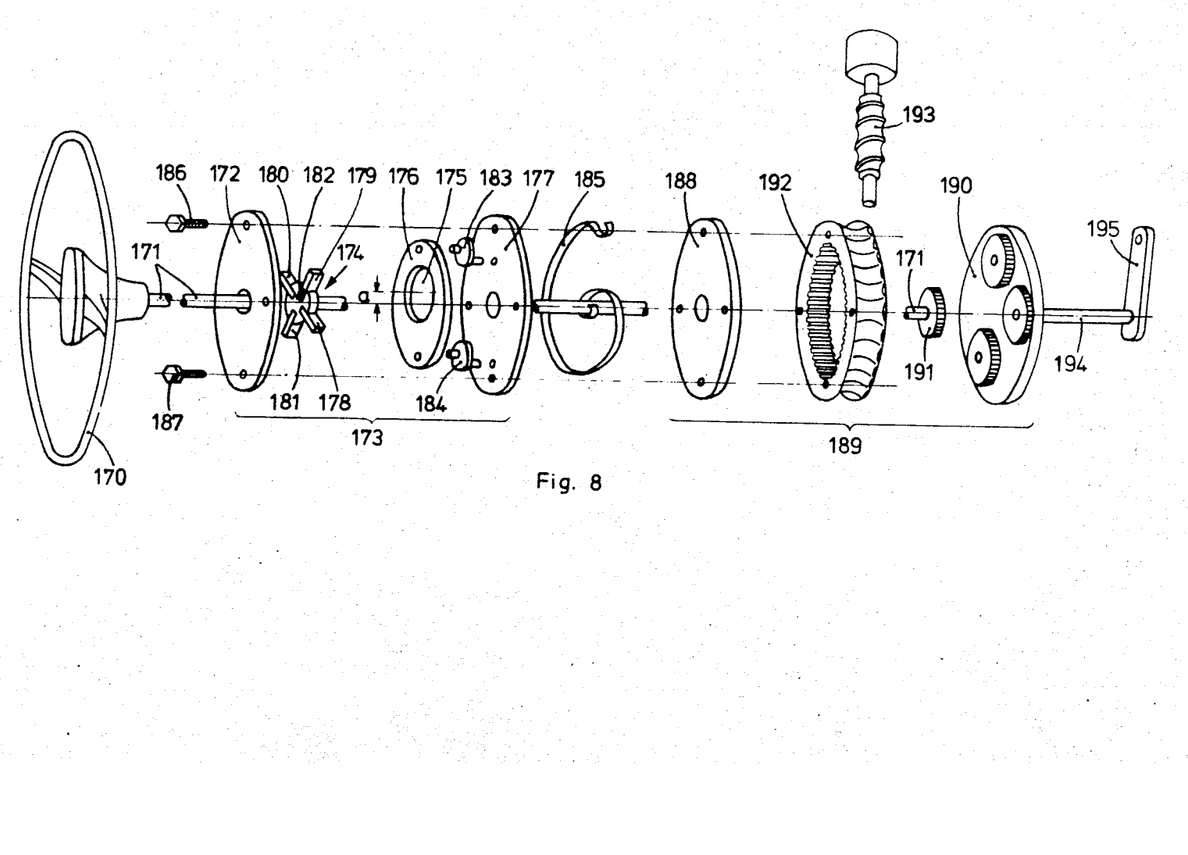

FIGS. 6–8 illustrate four different embodiments of the present invention; more particularly, FIG. 6 is an example for the application of an acitve and of passive members for the automatic generation of a supporting momentum, while FIGS. 7 and 8 relate to the application of passive members.

Referring to FIG. 6 and the problem mentioned in the summary of the present invention, it is noted that the solid line in FIG. 6 illustrates a usual lever arrangement with a cross-tie used to steer the motor vehicle wheels (not shown in FIG. 6). One can recongize the middle cross-tie 101 which, by means of guiding levers 102 and 103 with which it is coupled in a joint-like fashion at 104 and 105 and which in turn are jointed at 106 and 107 to the vehicle, is supported in a parallely tiltable fashion. At 108 and 109, also by means of joints, the side cross-ties 110 and 111 are jointed which are then coupled with the wheels in a known manner and, more particularly, as illustrated in FIG. 4. At 112 a two-arm lever is indicated which at 113 is jointed in rotatable fashion to the middle cross-tie 101. This in turn at the upper ends is jointed by means of the joint coupling 114, in addition to a connection with the steering damping means 115 over the intermediate lever 116 at 117, with the lever 118 which is one of the levers of the two that receives the rotational momenta. One of the levers 118, namely, serves for the insertion of the steering instructions of the operator, that is, the corresponding momenta into the lever arrangement. The other of this lever pair serving for the insertion of the momentum is indicated by the reference numeral 119 in the right side of FIG. 6. Also this, similarly to the lever 118, is in the region of its lower end pivotably or tailtably secured to the vehicle and in the region of its upper end at 120 is coupled by means of a rotating joint with the further intermediate lever 121 which at 122 is rotatably jointed to the end of the other lever arm of the two-armed lever 112. So far the arrangement illustrated in FIG. 6 corresponds to the invention described in connection with FIG. 4.

In the event there is a disturbing side force influencing the traveling direction of the vehicle, the regulator will produce a regulating magnitude which over the steering servo mechanism will produce a momentum. This momentum will be introduced into the other lever 119. Assuming now for a change that the disturbing side force comes from the right, then a momentum must be introduced into the other lever 119 which will cause a wheel turning to the right so that a counter steering will result. In connection therewith it is necessary that the other lever is tilted into the direction of the arrow. Over the intermediate lever 121 there must be transmitted such a momentum to the two-armed lever 112 which causes the guiding levers 102 and 103 also to be tilted in the sense of the arrow, and accordingly together with the middle cross-tie 101 the side cross-ties 110 and 111 will move also to the right in the figure. Since on the jointed coupling 113 forces operate from the side of the wheels which counter, or are opposite to, the change of the steering angle, such desired movement of the cross-ties will occur only when the joining point 117 forms a support for the intermediate lever 116 and thereby forms the upper end of the two-armed lever 112. Inasmuch as the one lever 118 can be moved freely, there occurs under the influence of the steering servo mechanism, that is, under the correcting momenta given thereby, a tilting of the two-armed lever 112 about the joint 113 which practically retains its position, so that the side cross-ties 10 and 11 practically remain motionless. It is also necessary in this case that the operator securely hold the steering wheel and produce a supporting momentum over the lever 18. Accordingly, the operator should not release the steering wheel.

With further reference to the embodiment of FIG. 6, so far the basic construction of the cross-tie containing lever arrangement has been given with the concurrent illustration and description of a problem which this embodiment is to solve. Now a possibility will be described for the automatic production of a supporting momentum on one of the levers 118. This arrangement comprises a servo system 123 which at 124 is secured to the vehicle and, for example, by means of a bar 125 at 126 rotatably engages the one lever 118 or its extension. To the servo system 123 there is fed, in a known manner, and in a way not illustrated here, a control magnitude proportional to the changes of the distance between the levers 118 and 119. This will suggest that at the appearance of disturbing side forces and, consequently, at the appearance of correcting momenta produced by the steering servo mechanism, the other lever 119 will rotate faster than the first lever 118 and thereby there is created a change of the distance between the two levers. The servo system 123 is constructed in such a manner that the forces produced thereby will take care that the joining point 117 will retain at least its approximate position. As a result, it is assured that the two-armed lever 112 is practically tilted about a point 114 when on it the momentum coming from the other lever 119 is transmitted over the intermediate lever 121. Consequently, this is accompanied by a necessary positioning of the middle cross-tie 101 and the side cross-ties 110 and 111 coupled therewith, in the form of a correction.

Instead of an active member 123 there may be used also passive members which then are connected between the levers 118 and 119 or between their extensions. For this purpose, in the embodiment according to FIG. 6, a shock absorber 127 of usual construction is jointed between the points 128 and 129 on both levers 118 and 119. At the appearance of disturbing side forces, a point 129 moves over a circular path about the lower bearing of the other lever 119 faster than the point 128 is moving about the corresponding bearing of the one lever 118. Inasmuch as the shock absorber 127 at quick relative movements between both levers 118 and 119, as is the case during the appearance of disturbing side forces, remains practically rigid, it will then transmit forces from the other lever 119 to the one lever 118 and at the latter will generate the supporting momentum. In contrast thereto, the shock absorber 123 in the static state, that is, during an intentional passing of a curve, is resilient so that it can be practically bridged by the spring 130. The characteristics selected for the spring 130 are such that the intentional steering is aided by the transmission of a force from the other lever 119 to the one lever 118, which is obtained in the form of a counter momentum with respect to the steering momentum produced by the operator at high speeds, while at low speeds it is manifested by an aiding momentum enlarging the momentum produced by the operator.

In the embodiment illustrated in FIG. 7, the reference numeral 140 denotes an input shaft of a differential drive generally identified by the reference numeral 141. The shaft 140 is coupled with the steering wheel and represents accordingly, as described above, the "one lever" 118 within the scope of the present invention. A second input of the differential drive 141 is formed by a worm wheel 142 which, by means of the worm 143 cooperates with the steering servo mechanism controlled by the regulator. The worm gear 143 can be considered as the other lever 119 within the scope of the invention as described hereinabove. The input shaft 140 is secured against rotation by the large compensating bevel gear 144, while the output shaft 145 of the differential drive is secured for rotation by the other large compensating bevel gear 146. The small compensating bevel gears 147 and 148 are secured at the right front face of the worm wheel 142, as seen in the figure, which itself runs on the output shaft 145 secured against displacement in the axial direction. The rotation of the output shaft 145 is created by the summation of the momenta of the steering wheel, the steering servo mechanism and also by the regulator.

The output shaft 145 operates on the steering gear generally identified as 149, which according to the principle of a ball racer guiding is coupled with a guiding spindle 150 and with a female part 151, which are also coupled with each other by means of the balls (not shown in the drawings). By the rotation of the guiding spindle 150 relative to the female part 151, axial displacements thereof are produced and are transmitted by means of the angular lever 152 onto the middle cross-tie 153, which, in turn, by means of the outer cross-ties 154 and 155 is coupled with the wheels, only the left wheel, identified at 156, being shown schematically.

This arrangement shows a further embodiment which is constructed according to the principle of ball racer guiding. On the front surface, at the left side of the figure, the worm wheel 142 carries a spindle projection 157 on which by means of balls (not shown in the drawing) a female part 158 runs. The pitch of both threaded spindles 150 and 157 is different and, more particularly, the pitch of the spindle 157 is larger than that of the spindle 150, so that at the appearance of disturbing side forces, that is, at the rotation of the worm wheel 142, the distance between the two female parts 151 and 158 will change. This distance change will be used over the shock absorber 159 which is arranged between both female parts 151 and 158 for the transmission of a force from the female part 158 onto the female part 151, which force, in turn, will then be translated into a supporting momentum with respect to the input shaft 140 of the differential gear 141. Parallel to the shock absorbers 159 there lies a coil spring 160 which, preferably, becomes effective in the static operational states, and then it will transmit a momentum aiding an intentional steering process from the female part 158 onto the shaft 140 and thereby onto the steering wheel.

Obviously, the arrangement illustrated in FIG. 7 will be provided in a common oil-filled housing.

The arrangement according to FIG. 8 operates with a hydraulic damping element. There is shown, from left to right, the steering wheel 170 which over a lever represented in the spirit of the present invention by the steering column 171 delivers the momenta corresponding to the steering instructions. The shaft 171 passes through a cover member 172 of the hydraulic damping arrangement, generally identified with 173, and the essential components of which are the star-like runner arrangement 174 secured to rotate with the shaft 171 and which in cooperation with the recess 175 and with the housing portion 176 serves for the reception of the runner 174. The housing portion 176 is mounted adjacent to a further front portion 177 of the damping arrangement 173.

Considering next the runner 174, it comprises in the present embodiment four projections 178 – 181 extending into the radial direction which by means of springs, only the compression spring 182 thereof associated with the projection 179 being shown, are pressed into the radial direction so that their front or tip surface abuts with the rim of the recess 175 in the housing portion 176, which in the assembled state of the arrangement lies in the same plane as the runner 174. As soon as the axes of the runner 174, on one hand, and of the recess 175, on the other hand, become aligned, the radial projections 178 – 181 together with the rim of the recess 175 form four equally large chambers, the size of which will not change even if there is a relative rotation between the runner 174 and the housing portion 176. It is different, however, when as a result of excentric mounting of the portion 176 on the cover part 177 there occurs between the axes of both a displacement "a." In this case the chambers defined by the rim of the recess 175 on one hand, and by the radial projections 178 – 181, on the other hand, will change their magnitude at a relative rotation, so that the individual chambers become smaller and, consequently, by the necessary outflow of the damping medium a momentum will be created. Even in case of an enlarging of the chambers such momentum will be created, since the damping medium must be sucked out from the surrounding areas. By changing the position of the excenter or camming bolts 183 and 184 on the cover member 177 which serves for the supporting of the housing portion 176, one may change the excentricity of the recess 175 with respect to the shaft 171 and thereby the damping effect of the arrangement 173.

Parallel to this damping arrangement there lies a spiral spring 185 which, like the so far described damping arrangement 173, is secured by means of screws 186 and 187 onto the cover member 188 of the gear arrangement 189.

The gear arrangement 189 comprises as essential components a planetary gear with an actual planetary arrangement 190 into which the shaft 171 protrudes and engages it by means of a sprocket wheel 191, as well as a rim portion 192 constructed as a worm wheel which in turn cooperates with a worm 193, the latter being connected with the steering servo mechanism. The worm 193 represents again the "other lever" described above by this definition. The output shaft of the gear arrangement 189 forming the steering gear is identified by the reference numeral 194. It is coupled with the cross-tie arrangement by means of the lever 195 in a known manner.

In the gear arrangement 189 there occurs again a summing of the steering momenta coming from the steering wheel 170 on one hand, and of the momenta created by the disturbing side forces and introduced by the worm 193 from the servo mechanism, on the other hand. Since the damping arrangement 173, the spring 185 and the cover member 188 by means of the above mentioned screws 186 and 187 are secured for rotation with the rim 192, again a compensating momentum is produced on the steering wheel 170 over the avove described damping arrangement 173, so that here the operator at a completely tuned arrangement can let the steering wheel go, even at the appearance of disturbing side forces.

It is also possible that the passive elements in FIGS. 7 and 8 be replaced by active elements.

Lastly, it is noted that the present invention is generally applicable to motor vehicles as well as air or seafaring vehicles.

From the above, it is apparent that although the invention has been described hereinbefore with respect to certain specific embodiments thereof, it is evident that many modifications and changes may be made without departing from the spirit of the invention. Accordingly, by the appended claims, we intend to cover all such modifications and changes as fall within the true spirit and scope of this invention.

Having thus described the invention, what we claim as new and desire to be secured by Letters Patent, is as follows:

1. In a motor vehicle, the combination of a steering arrangement with a control or regulating means for compensating the influence of disturbing side forces on the traveling direction, said regulating means comprising at least one first reference signal generator for producing signals corresponding or representative of the transverse movements of the vehicle, a first coupling member, said signals of said first reference signal generator being fed to said first coupling member, a second reference signal generator for producing signals representative of the steering instructions coming from the operator of the vehicle, said signals of said second reference signal generator being applied to said first coupling member, a first regulator device coupled to said first coupling member, said first coupling member forming a regulating magnitude from said signals of said first reference generator and of said second reference generator and delivering said regulating magnitude to said first regulator device, a steering servo mechanism coupled to said first regulator device, said first coupling member comprising a subtraction member forming said regulating magnitude as a difference of said signals of said first reference signal generator and said second reference signal generator, and said first regulator device being controlled by a first control magnitude depending from the forward velocity of the vehicle for modulating said regulating magnitude in dependence on said forward velocity and feeding said modulated regulating magnitude to said steering servo mechanism as a control variable therefor which ensures attaining of a regulated traveling curve without change in a predetermined region of said forward velocity.

2. The combination as claimed in claim 1, wherein a second regulator device is coupled between said first coupling member and said second reference signal generator, said second regulator device being controlled by a second control magnitude depending from said forward velocity of the vehicle for modulating said signals representative of the steering instructions coming from the operator of the vehicle and feeding said modulated signals to said first coupling member to produce a regulating magnitude therein for attaining a desired traveling stability.

3. The combination as claimed in claim 2, wherein said second regulator device is a non-linear regulator device ensuring a non-linear relationship between said signals representative of the steering instructions coming from the operator of the vehicle and said modulated signals fed to said first coupling member in order to produce a regulated magnitude therein which ensures a constant steerability of the vehicle at different steering instructions.

4. The combination as claimed in claim 1, wherein said first regulator device is a non-linear regulator device ensuring a non-linear relationship between said regulating magnitude and said modulated regulating magnitude in order to produce a regulating magnitude for attaining said regulated traveling curve without change in a predetermined region of the said side forces.

5. The combination as claimed in claim 1, wherein a second coupling member is connected between said first regulator device and said steering servo mechanism and having an input means coupled with said second reference signal generator, a third regulator device being coupled between said input means and said second signal generator, said third regulator device being controlled by a third control magnitude depending from said forward velocity for modulating said signals representative of the steering instructions coming from the operator of the vehicle and feeding said modulated signals to said second coupling member, said second coupling member adding said modulated signals to said modulated regulating magnitude produced in said first regulator device for attaining a desired relationship of the aiding effect by said steering servo mechanism to said steering instructions with respect to said forward velocity.

6. The combination as claimed in claim 5, wherein said third regulator device is a non-linear regulator device and ensures a non-linear relationship between said signals representative of the steering instructions coming from the operator of the vehicle and said modulated signals produced in said third regulator device in order to attain an aiding performed by said steering servo mechanism depending from the magnitude of said steering instructions.

7. The combination as claimed in claim 1, wherein a directional limiter means is coupled after said steering servo mechanism, said directional limiting means transmitting movements in the direction of the regulation.

8. The combination as claimed in claim 1, wherein a limit switch means is coupled after the steering servo mechanism for interrupting the control loop, said limit switch means being responsive to predetermined conditions in the regulating circuit, a third coupling member being arranged after said limit switch means, said third coupling member being an adding member for adding the forces or momenta coming from the steering servo mechanism and those produced in response to the steering instructions.

9. The combination as claimed in claim 8, wherein said third coupling member has a cross-tie means coupled thereto and comprises a lever means comprising a two-armed lever for guiding said cross-tie means in a parallel direction, said third coupling member and said cross-tie means being rotatably connected with each other by means of said lever means, one arm of said two-armed lever means having applied thereto forces corresponding to the steering instructions, the other of said lever arms of said two-armed lever means having applied thereto forces delivered by the steering servo mechanism, said forces on said two lever arms producing a rotational momentum, said rotational momentum causing said cross-tie means to move parallel on a path corresponding to the vector sum of said forces.

10. The combination as claimed in claim 9, wherein said one lever arm is coupled with a steering gear translating said steering instructions into a first angle of rotation and said other lever arm being coupled with said steering servo mechanism delivering a positioning magnitude in the form of a second angle of rotation, the length of said one and of said other lever arms being selected such that the second angle of rotation is offset by at least 1/10 with respect to the first angle of rotation.

11. The combination as claimed in claim 1, wherein said steering servo mechanism is formed as a regulating circuit.

12. The combination as claimed in claim 11, wherein said steering servo mechanism comprises coupled in the sequence toward the direction of regulation a discriminating means, a logic stage, a power switch means, a motor, and a feedback means from the output side of said motor returned to a fourth coupling member arranged as a subtraction member adjacent said discriminating means in the direction of regulation.

13. The combination as claimed in claim 1, wherein a pair of lever means are provided for transmitting rotational momenta, one of said lever means applying momenta produced by said steering instructions of the operator and the other of said lever means applying momenta produced by said steering servo mechanism into a lever arrangement comprising a cross-tie means being connected to the wheels of the vehicle, said one of said lever means having associated therewith means for providing a support against momenta introduced by the wheels into said lever arrangements when the momenta produced by said steering servo mechanism are applied to said wheels via said lever arrangement, said means for providing said support being responsive only to momenta produced in said steering servo mechanism caused by dynamic disturbing side forces.

14. The combination as claimed in claim 13, wherein said lever arrangement is adapted to allow relative motions between said lever means when the momenta produced by said steering servo mechanism are applied, said means for providing said support being connected to both of said lever means and responsive to the velocity of such relative motions.

15. The combination as claimed in claim 13, wherein means are connected to both of said lever means and constructed for transmitting a momentum produced in said servo steering mechanism to said one of said lever means when there are steering instructions coming from the operator of the vehicle, said momentum aiding the operator in the steering in a predetermined manner.

16. The combination as claimed in claim 15, wherein said aiding momentum at high vehicle velocities is oppositely directed to the momenta corresponding to the steering instructions, said aiding momenta at low speeds are directed in the same sense as the momenta corresponding to the steering instructions.

17. The combination as claimed in claim 13, wherein said means providing a support is connected to said one lever means and comprises an amplifying member and means supplying a control magnitude thereto characteristic to the appearance of the disturbing side forces.

18. The combination as claimed in claim 17, wherein said lever arrangement is adapted to allow relative motions between said lever means when the momenta produced by said steering servo mechanism are applied, said control magnitude being determined by the relative velocity between said levers.

19. The combination as claimed in claim 17, wherein said lever arrangement is adapted to allow relative motions between said lever means when the momenta produced by said steering servo mechanism are applied, said control magnitude being determined by changes of the distance between said lever means caused by such relative motions.

20. The combination as claimed in claim 17, wherein said means comprises a servo device.

21. The combination as claimed in claim 13, wherein said means for providing a support is connected to both of said levers and comprises damping means selected in such a manner that said passive member has a high pass characteristic with respect to the transmission of the forces producing momenta for obtaining said support.

22. The combination as claimed in claim 21, wherein spring means are provided in parallel with said damping means constructed for transmitting a momentum produced in said servo steering mechanism to said one of said lever means when there are steering instructions coming from the operator of the vehicle, said momentum aiding the operator in the steering in a predetermined manner.

23. The combination as claimed in claim 21, wherein said cross-tie means is mounted for movement parallel to itself and a two-armed lever rotatably connected to said cross-tie means and forming part of a third coupling means, one arm of said two-armed lever being coupled to said one of said lever means and the other arm of said two-armed lever being coupled to the other of said lever means, said coupling being such as to transmit momenta from said lever means to said lever arms, said cross-tie means being moved parallel on a path being determined by the vector sum of, the momenta applied via said lever means, and wherein said damping means comprises shock absorbing means supported between a pair of points on both levers, said lever arrangement being adapted to allow relative motion between said lever means when the movements produced by said steering servo mechanism are applied, said supporting point on said other lever at the appearance of said momenta moving faster in the axial direction of the shock absorbing means than the point on said one lever.

24. The combination as claimed in claim 21, wherein said cross-tie means is mounted by guiding levers for movement parallel to itself and a two-armed lever rotatably connected to said cross-tie means and forming part of a third coupling means, one arm of said two-armed lever being coupled to said one of said lever means and the other arm of said two-armed lever being coupled to the other of said lever means, said coupling being such as to transmit momenta from said lever means to said lever arms, said cross-tie means being moved parallel on a path being determined by the vector sum of the momenta being applied via said lever means, one of said levers is formed by an input shaft means of a differential drive means, a sprocket wheel means to which the momenta produced by said servo motor are applied, said sprocket wheel means being in coupling relationship with said other lever, said sprocket wheel means delivering said momentum to said differential drive, said differential drive being in the form of a subtraction member having an output shaft having a supporting gear of the ball racer type, said supporting gear comprising a female part connected with said guiding lever, a worm spindle coupled with said sprocket wheel means having a further female part, said worm spindle having a predetermined pitch larger than that of the supporting gear at least one shock absorbing means being arranged between said two female parts.

25. The combination as claimed in claim 24, further including at least one spring means associated with said shock absorbing means.

26. The combination as claimed in claim 21, wherein said one lever means is formed by an input shaft means of a planetary gear means, said planetary gear means together with a sprocket means formed on the outer rim of said planetary gear means being coupled with the other of said lever means and forming therewith a gear means adding the momenta, between said input shaft means and said sprocket means a damping means being provided.

27. The combination as claimed in claim 26, wherein said damping means comprises a runner means secured to said input shaft means, said runner means comprising radial projections spring means forcing said projections in the radial direction into a recess means against the wall portions of said recess means, said recess means being formed in a housing portion for a damping medium, said projections forming with said wall portions of said recess means chambers when abutting with said wall portions, said housing portions surrounding said input shaft means supported on the outer rim portion of said gear means vertically with respect to said input shaft means in such a manner that upon a shifting of the recess means with respect to said input shaft means said chambers will vary their size and thereby different damping affect is created.

28. The combination as claimed in claim 26, further including spring means associated with said damping member.

29. The combination as claimed in claim 1, wherein said regulating means is a regulating servo loop.

* * * * *